United States Patent [19]
Klose

[11] 3,918,861
[45] Nov. 11, 1975

[54] VULCANIZING PRESS WITH ROTARY LOCKING MECHANISM

[75] Inventor: Karl W. Klose, Findlay, Ohio

[73] Assignee: Cooper Tire and Rubber Company, Findlay, Ohio

[22] Filed: Oct. 11, 1974

[21] Appl. No.: 513,949

[52] U.S. Cl. ............................... 425/47; 425/34 R
[51] Int. Cl.² .......................................... B29H 5/02
[58] Field of Search ............. 425/31, 32, 33, 34, 35, 425/36, 38, 39, 40, 41, 42, 43, 44, 45, 46, 47

[56] References Cited
UNITED STATES PATENTS

| | | | |
|---|---|---|---|
| 2,198,493 | 4/1940 | Freeman | 425/40 |
| 2,279,540 | 4/1942 | Joth et al. | 425/36 |
| 2,290,630 | 7/1942 | Bosomworth et al. | 425/34 |
| 2,339,553 | 1/1944 | Bossomworth et al. | 425/34 |
| 2,345,838 | 4/1944 | Soderquist et al. | 425/47 |
| 2,358,763 | 9/1944 | Soderquist | 425/47 |
| 2,424,915 | 7/1947 | Bosomworth et al. | 425/40 |
| 3,054,141 | 9/1962 | Hammerfahr | 425/34 |
| 3,477,100 | 11/1969 | Peck et al. | 425/40 X |

*Primary Examiner*—J. Howard Flint, Jr.
*Attorney, Agent, or Firm*—Kemon, Palmer & Estabrook

[57] ABSTRACT

A vulcanizing press for tires, tubes or the like which may be of a single, twin or multiple cavity arrangement wherein each cavity functions as an independent curing unit. The curing unit includes a curing chamber embodying a fixed lower dome structure and a movable upper dome structure. The lower dome structure is provided with an annular rotatable locking mechanism configured to receive and engage the lower portion of the upper dome to effectively lock the upper and lower dome structures of the curing chamber. The locking mechanism counteracts the various forces that are generated by the internal pressure in the vulcanizing press during the curing operation.

16 Claims, 10 Drawing Figures

VULCANIZING PRESS WITH ROTARY LOCKING MECHANISM

BACKGROUND OF THE INVENTION

The present invention is directed to apparatus for shaping or treating plastic articles, such as tires and tubes, and more specifically to clamping and locking means for a vulcanizing press.

Vulcanizing press designs of two U.S. based companies have for the past 25 years tended to dominate the world market as a result of unquestionable acceptance of their developments combined with world-wide availability of their equipment through licensees. Although there are several smaller tire press producers in the world, their press designs, however, do not differ drastically from those offered by the two leading suppliers.

In most instances the design of said tire curing equipment is of the toggle link type in which massive structural members such as crank gears, trunnions, and heavy frame connecting beams are utilized to contain the large separating forces that are generated during closing and molding of a tire. These heavy structural members must be moved during the opening and closing operations of the vulcanizing press which requires a great deal of energy. A typical dual cavity passenger tire vulcanizing press weighs approximately 18 to 20 tons. Equipment of this type is difficult to install and demands special flooring and appropriate support structures.

The tire curing molds or presses as typified by the patents to Wattleworth U.S. Pat. No. 1,285,853 dated Nov. 26, 1918 and Bosomworth et al, U.S. Pat. No. 2,290,630 dated Jul. 21, 1942, and 2,393,503 dated Jan. 22, 1946, show single and twin cavity structures with interlocking means for securing the upper chamber cavity to the lower chamber cavity. Such prior art does tend to show the broad concept of having the upper and lower dome structures joined to one another by a bayonet type of lock through the rotation of one structure with respect to the other. In such a bayonet type of locking arrangement, the upper and lower dome or mold structures are provided with radially projecting lugs arranged to overlie one another, so that when said lugs are in registry with one another the upper and lower portions of the structure are usually locked together. In the Wattleworth patent for instance, closing is accomplished by rotating the two mold halves, relative to one another, and through the engagement of opposing lugs having inclined surfaces which must interact to achieve mold closing. During rotation, a high degree of friction is being generated which requires a great deal of tangential force resulting in rapid wear on the inclined lug surfaces. This concept does not lend itself to modern tire designs because of obvious tread pattern alignment problems between the two mold halves.

SUMMARY OF THE INVENTION

The present invention is directed to a vulcanizing press including a curing chamber having a fixed lower dome structure and a movable upper dome structure with a unique type of locking device. In the present concept, the use of the conventional massive structural members, such as links, trunnions, and the like have been eliminated so that the weight of the press is generally less than half of the weight of the conventional type press. The uniquely designed locking device counteracts all of the forces which are being generated by the internal pressure in the vulcanizer during the curing operation. In the present design, forces are not transmitted into any of the structural members of the press so that the press is simple and compact requiring less floor space while having better mold alignment due to the path of travel of the upper dome structure which requires less power.

Furthermore, the present invention embodies at least a single cavity arrangement wherein an upper chamber is moved in a vertical path into and out of engagement with a fixed lower chamber and the two chambers are locked to one another by circumferential engagement of the lower part of the upper chamber with the upper part of the lower chamber. As a result of the aforementioned vertical movement the two chambers are maintained in a parallel relation or alignment with one another continuously during the opening and closing and locking of the mold. The foregoing readily lends itself to the production of a precision product wherein uniformity is maintained throughout.

In addition the uniqueness of the locking mechanism of the present invention offers greater mechanical advantages than existing press concepts. As a result the large forces required to contain the separating reactions of a mold during curing can be created with drive motors which are only a fraction in size of those needed on toggle link presses. In the vulcanizing press of the present invention forces are not transmitted into other structural machine members so that tremendous savings in material and reduction in overall machine weight are achieved. In addition savings in power consumption are realized from the locking mechanism of the present invention.

In the present concept, the use of single cavity curing increases productivity as there is no second cavity down during mold change or maintenance operations. In addition, this makes scheduling of curing more flexible while at the same time, because of the independent operation of each cavity within a multiple cavity system, cure times can be scheduled to meet specific tire curing specifications.

DESCRIPTION OF THE PREFERRED EMBODIMENT

Figure 1:
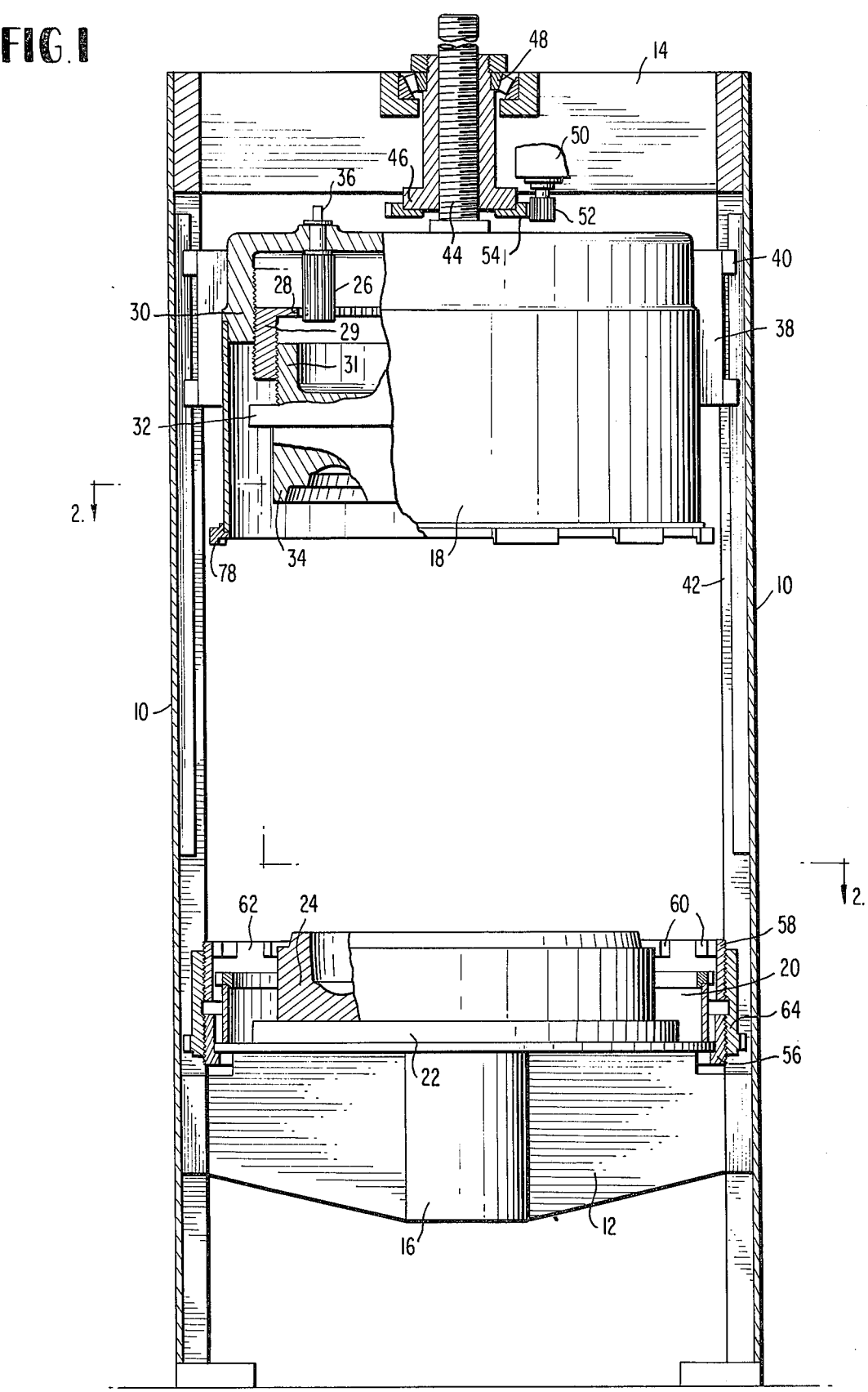
FIG. 1 is a front elevational view, partly in section, of a vulcanization press with rotary locking mechanism embodying the present invention.

Referring to FIG. 1, there is shown a pair of vertical column members 10 that are arranged in spaced parallel relation to one another with their lower ends being supported upon a suitable base member such as the floor of a building or the like. The lower end portions of the columns 10 are connected by a horizontally disposed cross member 12 while the upper end portions of the columns 10 are connected by a transverse cross member 14. The lower horizontal member 12 is intended to house in the central portion 16 thereof, a bladder control mechanism, not shown, and also to constitute a support for the curing chamber of the press. The curing chamber consists of a two-part dome-like structure with the upper part 18 being movable and the lower part or chamber 20 being fixed or supported upon the cross member 12. The lower dome half of the curing chamber is provided with a circular disc 22 that is formed with built-in steam chambers, not shown, for heating the lower mold half 24.

The upper dome chamber 18 carries threaded internal members which are capable of adjustment with respect to one another to allow for mold thickness variations. This adjustment is accomplished through a pinion gear 26 and ring gear 28 in conjunction with threaded members 29 and 30 with the member 29 carrying a threaded platen support 31. The platen support 31 carries on its lower surface thereof, a circular steel disc 32 which is provided with integral steam chambers, not shown, for heating the upper mold half 34. The adjustability of the threaded members 29 and 30 as well as that of the platen support 31 is accomplished by rotating a shaft 36 that is carried by the pinion gear 26.

In a single cavity installation, the external surface of the upper dome chamber 18 may be provided with a pair of diametrically disposed brackets 38 that are formed with outwardly extending projections 40 that engage suitable guide rails 42 provided on the inner surface of the vertical column members 10. In an installation wherein there are two or more cavities arranged in pairs or in a row or the like, the guide rails 42 in conjunction with the brackets 38 would not be utilized. Thus in a multi-cavity installation, the upper dome chamber would simply be raised and lowered by suitable mechanism with respect to the lower dome chamber and in such situations the upper dome chamber might be automatically guided into engagement with the lower dome chamber during the final stages of its movement towards the lower dome chamber.

In a single cavity installation, such as shown in FIG. 1, the upper dome chamber 18 has detachably connected thereto, by any suitable means, not shown, a non-rotating vertical rod member 44 which is threaded throughout its length for engagement with an internally threaded sleeve member 46 which is carried by the transverse cross member 14. The sleeve member 46 is mounted in suitable bearing supports 48 carried by the cross member 14 and said sleeve member is rotatably driven by means of a suitable motor 50 having a pinion gear 52 that meshes with a ring gear 54 all of which are carried by the cross member 14.

Figure 3:
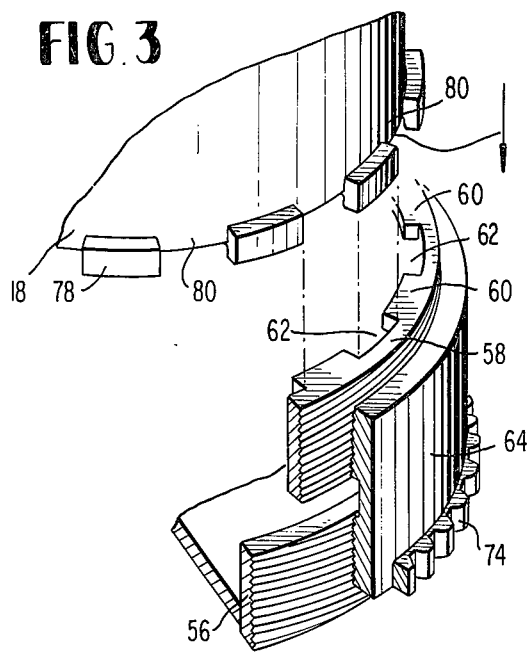
FIG. 3 is a perspective view of a portion of the rotary locking mechanism prior to the upper dome structure of the mold being moved into engagement with the lower dome structure.
Figure 3A:
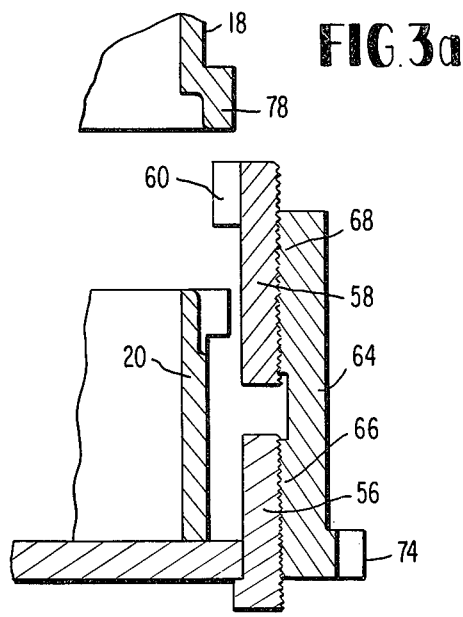
FIG. 3A is a vertical sectional view of the locking mechanism shown in FIG. 3.

The locking mechanism for securing the upper dome chamber 18 to the lower dome chamber 20 includes an externally threaded base ring 56 which is secured to and carried by the lower dome chamber 20. The base ring 56, as shown in FIG. 3, has associated therewith in vertically spaced co-axial relation an externally threaded locking ring 58 which has formed, at its upper edge, a plurality of annularly spaced inwardly projecting lugs 60. The spaced lugs 60 as formed on the inner surface of the locking ring 58 at the upper end thereof define annularly spaced slots or recesses 62 to facilitate the locking of the upper dome chamber 18 to the lower dome chamber 20. The base ring 56 has mounted thereon an elongated annular pull down ring 64 which is provided at its lower protion 66 with internal threads designed to engage the external threads of the base ring 56. The upper portion 68 of the pull down ring 64 is formed with suitable internal threads that are adapted to engage the external threads formed on the elongated locking ring 58. The threads formed on the inner surface of the lower and upper portions 66 and 68, respectively, of the pull down ring 64 are arranged in opposite directions with respect to one another. That is, the threads on the lower portion 66 of the pull down ring 64 could be right hand threads while the threads on the upper portion 68 could be left hand threads, or the threaded arrangement might be simply the reverse of the foregoing, but the threaded arrangement of the lower portion 66 with respect to the upper portion 68 of the pull down ring 64 should be opposite to one another, so that, the ring 64 during rotation in one direction will move in a vertical direction with respect to the base ring 56, while the rotation of the locking ring 58 in an opposite direction will result in the vertical movement of said locking ring with respect to the pull down ring 64.

Figure 2:
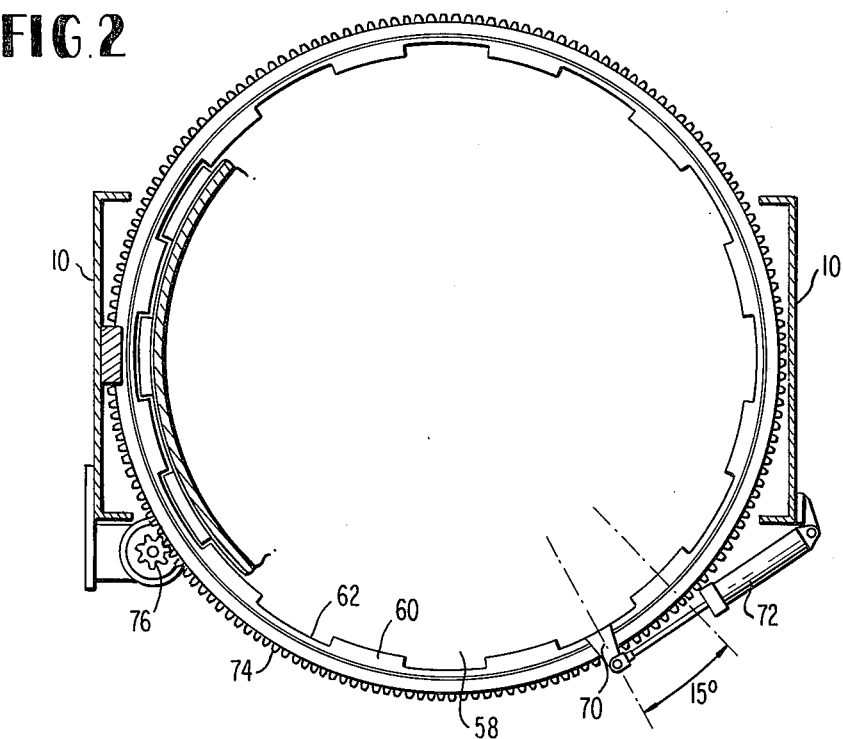
FIG. 2 is a horizontal sectional view of the vulcanization press, the view being taken on the line 2—2 of FIG. 1.

The locking ring 58, FIG. 2, has mounted on the upper edge portion thereof, an outwardly projecting flange member 70 which has connected thereto an air cylinder 72 which may in turn be fastened to one of the vertical column members 10. The pull down ring 64 has provided on the lower portion 66 an external ring gear 74 which may extend throughout the entire circumference of the pull down ring 64 or may simply extend through a segmental portion of said pull down ring. A suitable drive means is provided for rotation of the pull down ring 64 and same may include a motor, not shown, carried by one of the vertical column members 10 and which motor would drive a suitable pinion 76, as shown in FIG. 2, that in turn would mesh with the ring gear 74.

The lower or bottom end of the upper dome chamber 18 FIG. 1, is provided with an external annular ring flange consisting of a plurality of spaced radially projecting lugs 78. The annularly spaced lugs 78 define a plurality of annularly spaced slots or recesses 80, FIG. 3 so that the configuration of the ring flange on the lower or bottom end of the upper dome chamber 18 is complimentary to the configuration of the inner surface of the locking ring 58.

Figure 4:
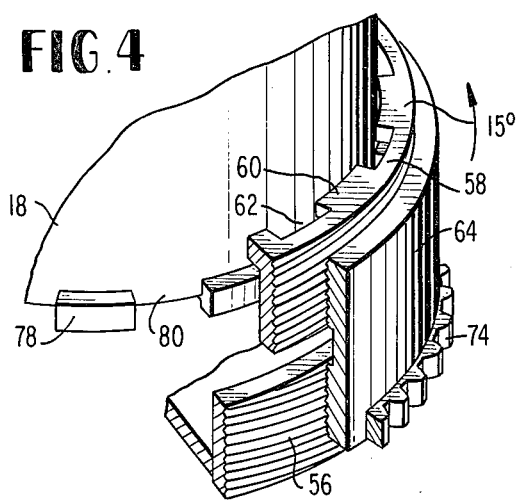
FIG. 4 is a perspective view of a portion of the locking mechanism similar to FIG. 3 but showing the upper dome structure engaging the lower dome structure.
Figure 4A:
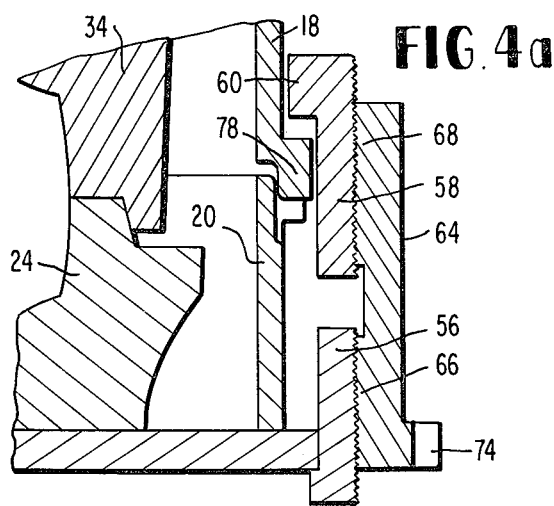
FIG. 4A is a vertical sectional view of the locking mechanism shown in FIG. 4.
Figure 5:
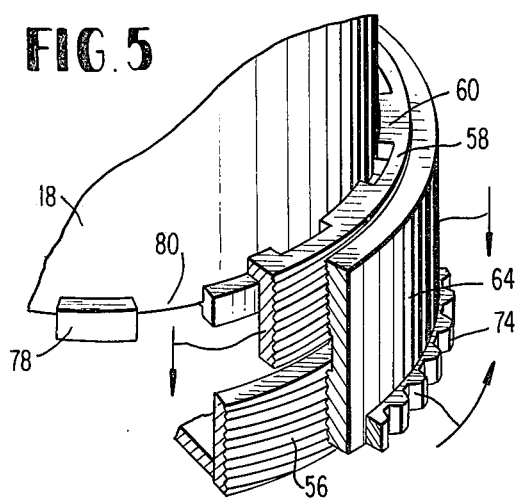
FIG. 5 is a perspective view of a portion of the locking mechanism of the upper and lower dome structures showing said structures locked together.
Figure 5A:
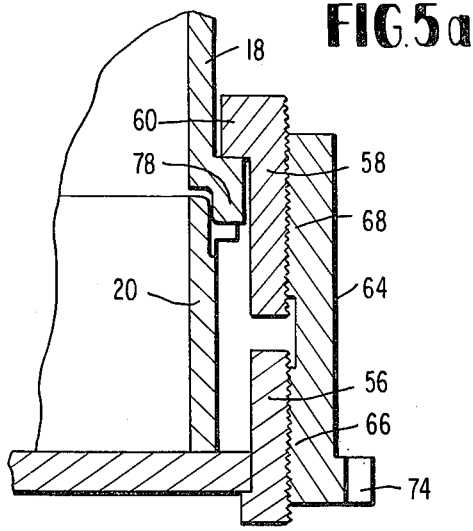
FIG. 5A is a vertical sectional view of the upper and lower dome structures locked together as shown in FIG. 5.

In the use or operation of the vulcanization press of the present invention and assuming that the upper dome chamber 18 is in the position as shown in FIG. 1, a green tire which is to be cured may be loaded into the lower mold half 24. Upon the actuation of a suitable switch, the motor 50 carried by the cross member 14 can be energized so as to effect a lowering of the upper dome chamber 18 by means of the rod member 44 and the threaded sleeve member 46. As the upper dome chamber 18 approaches the lower dome chamber 20 with the brackets 38 and the projections 40 riding on the guide rails 42, the radially projecting lugs 78 on the lower end of the upper dome chamber 18 should be in registry with the slots or recesses 62 defined on the inner surface of the locing ring 58 by the inwardly projecting lugs 60 on said locking ring. In the event that said slots 62 are not in registry with the lugs 78 the actuation of the air cylinder 72, by means of a suitable switch, should result in the rotation of the locking ring 58 through a suitable arc so as to bring the slots 62 into registry with the lugs 78 on the lower end of the upper dome chamber 18. With the lugs 78 in registry with the slots 62, the upper dome chamber 18 will be lowered until contact is made between the upper and lower mold halves as illustrated in FIG. 4A.

As the upper dome chamber moves into the area of the locking ring 58 and the upper mold half 34 engages the lower mold half 24, a suitable limit switch, not shown, would be activated to stop the motor 50 which, of course would also stop the rotation of the sleeve member 46 and the vertical movement of the rod 44. With the upper dome chamber 18 being within the area of the locking ring 58, the air cylinder 72 is actuated so as to rotate the locking ring 58 in order to position the lugs 60 on said locking ring in a vertically aligned relation with the lugs 78 provided on the lower end of the upper dome chamber 18. It is to be particularly noted that during the rotation of the locking ring 58, the lugs 60 of the locking ring 58 and the lugs 78 on the lower end of the upper dome chamber 18 are not in engagement with one another but are maintained in spaced relation, FIGS. 4 and 4A, so that there is no downward force of any sort being applied to the ring flange of the upper dome chamber 18. A suitable limit switch, not shown, is utilized to sense or determine the position of the locking ring 58 after it has been rotated a sufficient distance so as to position the lugs 60 in aligned relation with the lugs 78 on the ring flange of the upper dome chamber 18.

With the locking ring 58 in proper position with respect to the ring flange on the upper dome chamber 18, the motor, not shown, for rotating the pinion gear 76 may be activated so as to drive the ring gear 74 on the pull down ring 64 which rotative movement will move the pull down ring 64 over the surface of the base ring 56 in a downward direction so that the lugs 60 on the locking ring 58 will move into engagement with the lugs 78 on the ring flange of the upper dome chamber 18 and thus cause a vertical downward motion of the locking ring 58. The engagement of the lugs 50 with the lugs 78 results in a uniform circumferential engagement of the lower portion of the upper chamber 18 with the upper portion of the lower chamber 20 so that the two chambers are maintained in parallelism during the curing operation. The rotation of the pinion 76 with respect to the ring gear 74 and the subsequent downward motion of the locking ring 58 will, of course, remain activated, as the lugs 60 engage the lugs 78 and will remain so until the downward forces so created though such lug engagement are equal to or greater than the separating forces created inside the tire mold as a result of the internal pressure developed therein. A suitable force calibrated load sensing relay, not shown, may be utilized for deactivating the drive means 76 and 74. It is to be noted that the locking of the vulcanization mold and press has been achieved through the unique locking ring 58 which is readily capable of acting bi-directionally by combining free, frictionless rotation with vertical, high load-producing downward motion capability. The mold press will remain in a closed and locked position until the cure cycle has been completed.

Upon the completion of the curing cycle and after the pressure within the mold has been reduced to a point wherein the mold can be safely opened, the motor for driving the pinion 76 and ring gear 74 will be activated so as to rotate the pull down ring 64 in such a direction as to move said ring upwardly over the threaded outer surface of the base ring 56 which movement, of course, will result in an elevation of the locking ring 58. The rings 64 and 58 will be rotated a sufficient distance so as to insure that the lugs 60 on the inner surface of the locking ring 58 are spaced from the lugs 78 on the ring flange of the upper dome chamber 18, or to approximately the position as shown in FIG. 4A, at which time the lugs 60 will be in registry with the slots 80 and the lugs 78 will be in registry with the slots 62. At this time the drive means 76 and 74 will be deactivated and the motor 50 and associated drive mechanism carried by the cross-member 14 will be activated so as to raise the upper dome chamber by means of the vertical rod member 44. When the upper dome chamber has been elevated by means of said rod member, the finished tire may then be stripped from the lower mold 24 and removed from the press.

Figure 6:
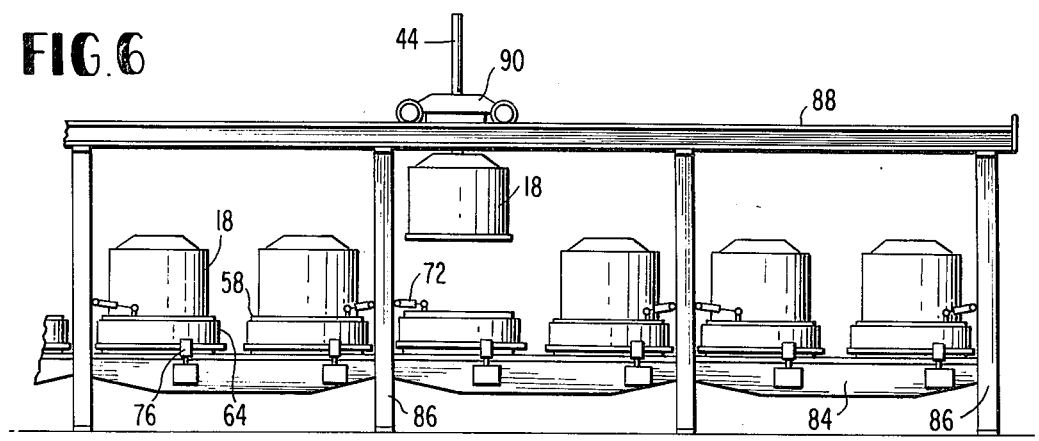
FIG. 6 is an elevational view showing a plurality of cavities arranged in a row with a single member mounted on a common head beam with means for elevating the upper dome structure.
Figure 7:
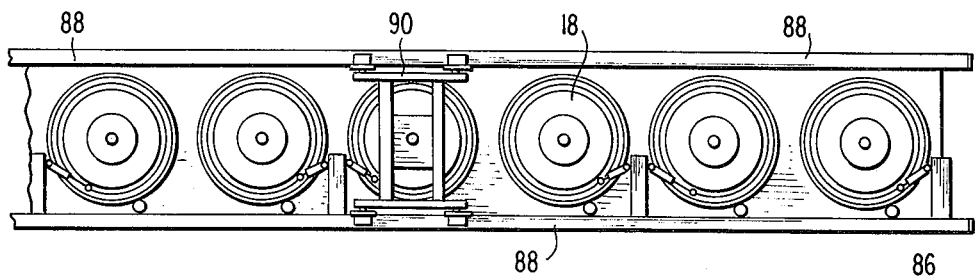
FIG. 7 is a top plan view of the cavities shown in FIG. 6.

The present concept has been described herein above as applied to a press consisting of a single cavity but as illustrated in FIGS. 6 and 7, two or more cavities may be readily joined together in a side by side relation and same may readily utilize the principles embodied in a single cavity. As an illustration of the foregoing, FIG. 6 shows six cavities arranged in a row which are mounted on horizontal beams or cross-members 84 carried by vertically spaced column members 86. The vertical column members 86 support, in a horizontal plane, a pair of spaced parallel cross-members 88, FIG. 7, which constitute a track means for a movable head beam 90. Each of the cavities is similar in many respects to the cavity as shown in FIG. 1 and the various parts thereof have been identified by the same reference numerals.

As shown in FIGS. 6 and 7, the movable head beam 90 has been positioned over the fourth cavity from the righthand side of the figures. The rod member 44 has been lowered so as to engage the upper dome chamber 18 for the purpose of elevating same with respect to the lower dome chamber so that if a tire has been cured and the press is being opened, then the cured tire can be readily removed from the lower mold half by suitable unloading means carried on the end of an arm which is pivotally mounted on a vertical support carried by the horizontal beams 84. At the same time that the cured tire is removed from the lower mold half, a green tire may then be inserted into the lower mold half by means fo a suitable loader, similar to the aforementioned unloader, and the curing bladder may then be properly inserted into the green tire after which time the upper dome chamber 18 may then be lowered into engagement with the lower dome chamber and same locked in position by means of the locking mechanism as described in conjunction with the cavity as shown in FIGS. 1 through 5. Once the upper dome chamber has been locked and secured to the lower dome chamber, the rod member 44 is disconnected from the upper dome chamber 18 so that the head beam 90 is then free to move over the track means to position itself over another cavity for the purpose of effecting a separation of the upper dome chamber from the lower dome chamber and the subsequent unloading and loading of the mold.

It becomes readily apparent that the locking concept as employed with the mold cavity of the present invention readily lends itself to a greater flexibility in press arrangement and utilization. The concept of having a plurality of cavities arranged in the manner as illustrated in FIGS. 6 and 7 or in a circle or some other similar arrangement enables each cavity to be operated independently of the other which arrangement definitely increases productivity inasmuch as only one cavity or station is down at any one time when removing a tire therefrom. Such an arrangement allows for a varied curing schedule depending upon the specifications that might be set for various tires to be cured while at the same time requiring less personnel to effect a loading and unloading of the various cavities as the curing cycle is completed.

The use of built in or integral steam chambers, such as referred to in discs 22 and 32, has been by way of illustration only as to one type or embodiment of operation that could be employed in the curing utilizing the structure of the present invention. It is to be understood however, that the present invention is readily adaptable to other curing principles.

Although the foregoing description is necessarily of a detailed character, in order that the invention may be completely set forth, it is to be understood that the specific terminology is not intended to be restrictive, or confining, and that various rearrangements of parts and modification of details may be resorted to without departing from the scope or spirit of the invention as herein claimed.

What I claim:

1. In a clamping and locking mechanism for securing cooperating elements to one another including a fixed lower element and a movable upper element, a ring member secured to said fixed lower element, a locking ring co-axial with said ring member and arranged in superimposed spaced relation thereto, a pull down ring engaging said locking ring and said ring member, said locking ring having a plurality of circumferentially spaced lugs arranged to define a slot between adjacent lugs, a ring flange provided on said upper element and including a plurality of circumferentially spaced lugs arranged to define a slot between adjacent lugs, means for moving said upper element towards said lower element with the slots in said locking ring permitting said ring flange lugs to pass therethrough with the lower end of said upper element engaging said lower element, means engaging said locking ring and rotating same with respect to said flange to move the lugs on said locking ring to wherein they overlie in vertically spaced relation the lugs of said flange and means for rotating said pull down ring about said ring member to move said locking ring towards said ring member while moving the lugs on said locking ring into engagement with the lugs of said ring flange to secure said upper element to said lower element.

2. In a mechanism as set forth in claim 1 wherein said ring members and locking ring are provided with external threads and said pull down ring is provided with internal threads.

3. In a mechanism as set forth in claim 1 wherein said locking ring lugs are arranged to project inwardly of said ring and said ring flange lugs are arranged to project outwardly of said upper element.

4. In a mechanism as set forth in claim 1 wherein said pull down ring is formed with a threaded upper portion and a threaded lower portion with the threads on said portions running in opposite directions.

5. In a mechanism as set forth in claim 1 wherein said first named means includes a rod connected to said upper element and a rotatable sleeve associated therewith and a driving member for said sleeve.

6. In a mechanism as set forth in claim 1 wherein said third mentioned means includes a ring gear on said pull down ring and a driving member engaging said ring gear.

7. In a tire vulcanizing press having at least one curing chamber including a fixed lower dome structure and a movable upper dome structure, an externally threaded elongated ring member secured to and carried by said fixed lower dome structure, an externally threaded elongated locking ring, said locking ring being co-axial with said ring member and arranged in superimposed spaced relation thereto, an internally threaded pull down ring engaging said externally threaded locking ring and said ring member, said locking ring having a plurality of inwardly projecting lugs arranged in circumferentially spaced relation to one another and defining a slot between adjacent lugs, a ring flange provided on said upper dome structure and including a plurality of radially projecting lugs arranged in circumferentially spaced relation to one another and defining a slot between adjacent lugs, means for moving said upper dome structure towards said lower dome structure with the slots in said locking ring receiving the lugs of said ring flange and permitting said lugs to pass therethrough with the lower end of said upper dome engaging said lower dome, means engaging said locking ring and rotating same with respect to the ring flange of said upper dome structure to move the lugs on said locking rings to wherein they overlie in vertically spaced relation the lugs of said ring flange and means for rotating said pull down ring about said ring member to move said locking ring towards said ring member while moving the lugs on said locking ring into engagement with the lugs of said ring flange to secure said upper dome structure to said lower dome structure.

8. In a tire vulcanizing press as set forth in claim 7 wherein said pull down ring is formed with an upper portion and a lower portion with threads on the upper portion being spaced from threads on the lower portion and the threads on said portions running in opposite directions.

9. In a tire vulcanizing press as set forth in claim 7 wherein said first named means includes a rod member and a motor.

10. In a tire vulcanizing press as set forth in claim 7 wherein said second mentioned means includes an air cylinder connected to said locking ring.

11. In a tire vulcanizing press as set forth in claim 7 wherein said third mentioned means includes a ring gear on said pull down ring and a drive pinion engaging said ring gear.

12. In a tire vulcanizing press as set forth in claim 7 wherein said curing chamber is positioned between at least one pair of vertical supports with a horizontal support connected to the bottom portion of said vertical supports, said lower dome structure being secured to said horizontal support.

13. In a tire vulcanizing press as set forth in claim 12 wherein said vertical supports are connected at their upper ends by at least one transverse member, an non-rotatable rod positioned within an internally threaded rotatable sleeve mounted on at least one transverse member, said rod being detachably connected to said upper dome structure and driving means for rotating said sleeve to raise and lower said upper dome structure.

14. In a tire vulcanizing press as set forth in claim 12 wherein said vertical supports are provided with guide rails for receiving projections carried by said upper dome structure.

15. In a tire vulcanizing press as set forth in claim 7 wherein a plurality of curing chambers are arranged in a row with a pair of transverse members arranged in spaced parallel relation to one another, a movable head beam positioned on said transverse members and a rod member carried by said head beam for engaging said upper dome structure.

16. In a tire vulcanizing press as set forth in claim 15 wherein said rod member is detachably connected to the upper dome structure of the various curing chambers.

* * * * *